United States Patent [19]

Maddocks

[11] 4,035,306

[45] July 12, 1977

[54] REMOVABLE CARTRIDGE FILTER

[75] Inventor: Gerald E. Maddocks, Cambridge, Calif.

[73] Assignee: Sheller-Globe Corporation, Toledo, Ohio

[21] Appl. No.: 706,747

[22] Filed: July 19, 1976

Related U.S. Application Data

[63] Continuation of Ser. No. 589,389, June 30, 1975, abandoned.

[51] Int. Cl.² .................................. B01D 27/06
[52] U.S. Cl. .................... 210/440; 210/DIG. 17
[58] Field of Search .......... 210/130, 136, 440, 443, 210/DIG. 17; 29/163.5 F, 173, 446

[56] References Cited

U.S. PATENT DOCUMENTS

| | | | |
|---|---|---|---|
| 1,453,471 | 5/1923 | LeTarte | 29/173 X |
| 1,940,316 | 12/1933 | McKinley | 210/DIG. 17 |
| 3,036,711 | 5/1962 | Wilhelm | 210/DIG. 17 |
| 3,203,302 | 8/1965 | Frederick | 29/446 X |
| 3,224,585 | 12/1965 | Scavuzzo et al. | 210/DIG. 17 |
| 3,232,437 | 2/1966 | Hultgren | 210/DIG. 17 |
| 3,256,989 | 6/1966 | Hultgren | 210/130 |
| 3,313,552 | 4/1967 | McElya et al. | 29/173 X |
| 3,467,256 | 9/1969 | Humbert, Jr. et al. | 210/440 X |
| 3,473,664 | 10/1969 | Hultgren | 210/440 X |
| 3,529,721 | 9/1970 | Papp | 210/443 X |
| 3,589,517 | 6/1971 | Palmai | 210/443 X |

Primary Examiner—Thomas G. Wyse
Assistant Examiner—Robert H. Spitzer
Attorney, Agent, or Firm—Barnes, Kisselle, Raisch & Choate

[57] ABSTRACT

A filter comprising a casing having a hollow body and a closed end and an open end, a cartridge including a filter element, said cartridge being generally toroidal and having an end member with circumferentially spaced integral spring members extending generally axially thereof into engagement with the inner surface of the closed end of the casing, and a closure member closing the open end of the casing and yieldingly urging said filter element toward said closed end against the action of said integral spring members.

1 Claim, 7 Drawing Figures

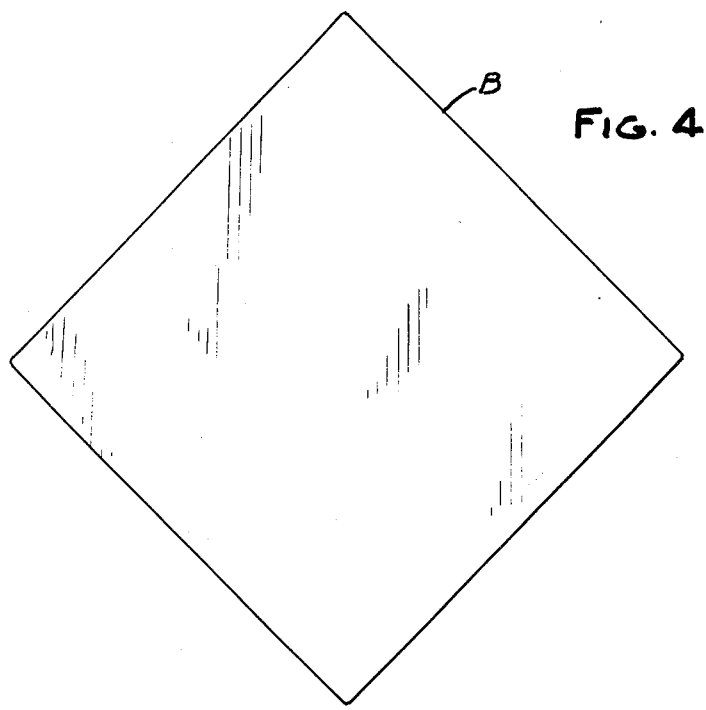
FIG. 4
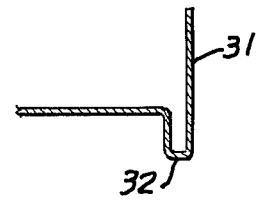
FIG. 6
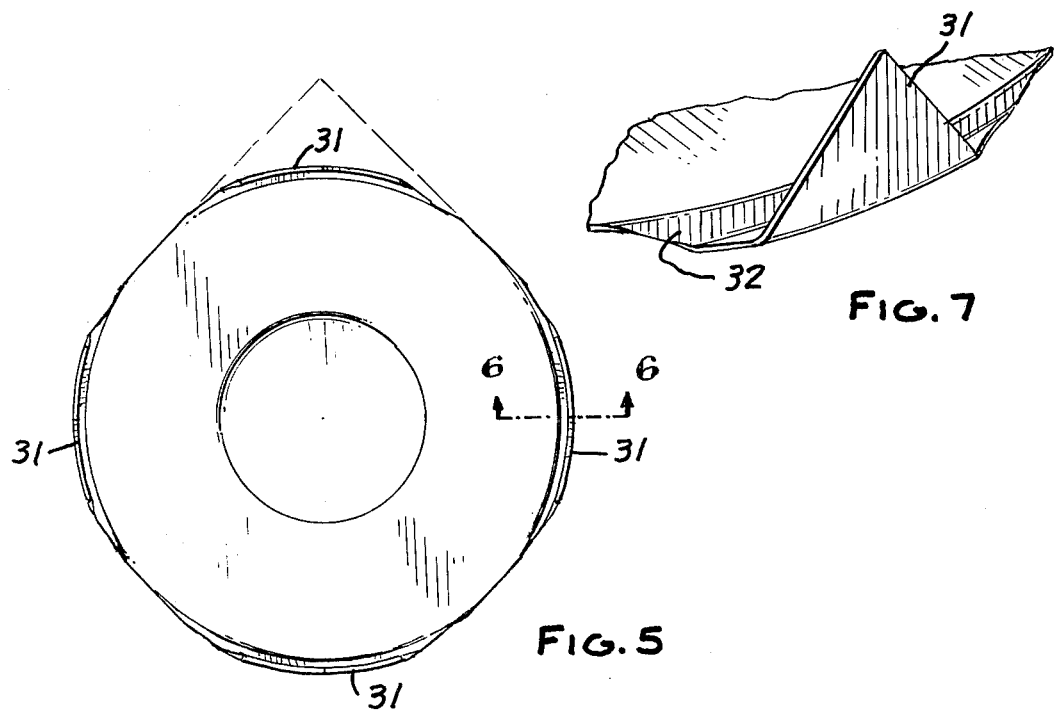
FIG. 7
FIG. 5

REMOVABLE CARTRIDGE FILTER

This application is a continuation of application Ser. No. 589,389, filed June 30, 1975 now abandoned.

This invention relates to oil or fuel filters.

BACKGROUND OF THE INVENTION

In oil or fuel filters, it is common to utilize a casing in which a filter element is positioned. The casing has an integral closed end and the other end sealed by a closure member. A spring normally urges the filter element in one direction against the closure member.

In such oil filter constructions, a separate spring is most commonly used. Although it has heretofore been suggested that the spring be made a part of the end member of the cartridge, as in U.S. Pat. Nos. 3,258,122 and 3,567,023, no practical construction has been found commercially to eliminate the use of the separate spring.

Accordingly, among the objects of the invention are to provide a filter wherein the spring force for holding the cartridge in position is obtained by integral spring members forming a part of the end element of the cartridge; wherein such a construction is achieved most economically without waste; wherein the spring force is obtained during the assembly of the filter; and wherein a novel method is utilized in making the filter.

SUMMARY OF THE INVENTION

In accordance with the invention, the filter comprises a casing having a hollow body and a closed end and an open end. A cartridge includes a filter element and is generally toroidal and has an end member with circumferentially spaced integral spring elements extending generally axially thereof into engagement with the inner surface of the closed end of the casing. A closure member closes the open end of the casing and yieldingly urges said filter element toward said closed end against the action of said integral spring members.

DESCRIPTION OF THE DRAWINGS

FIG. 4 is a plan view of a blank utilized in forming the end element of the filter cartridge.

FIG. 5 is a plan view of the end element after it is formed and before assembly in the cartridge.

FIG. 6 is a fragmentary sectional view on an enlarged scale taken along the line 6—6 in FIG. 5.

FIG. 7 is a fragmentary perspective view of the portion of the end element shown in FIG. 6.

DESCRIPTION

Figure 1:
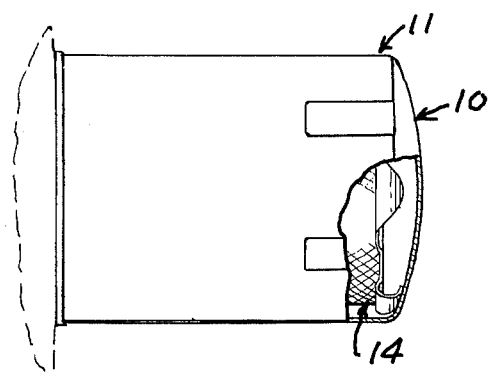
FIG. 1 is a part sectional view of a filter embodying the invention shown in operative position.
Figure 2:
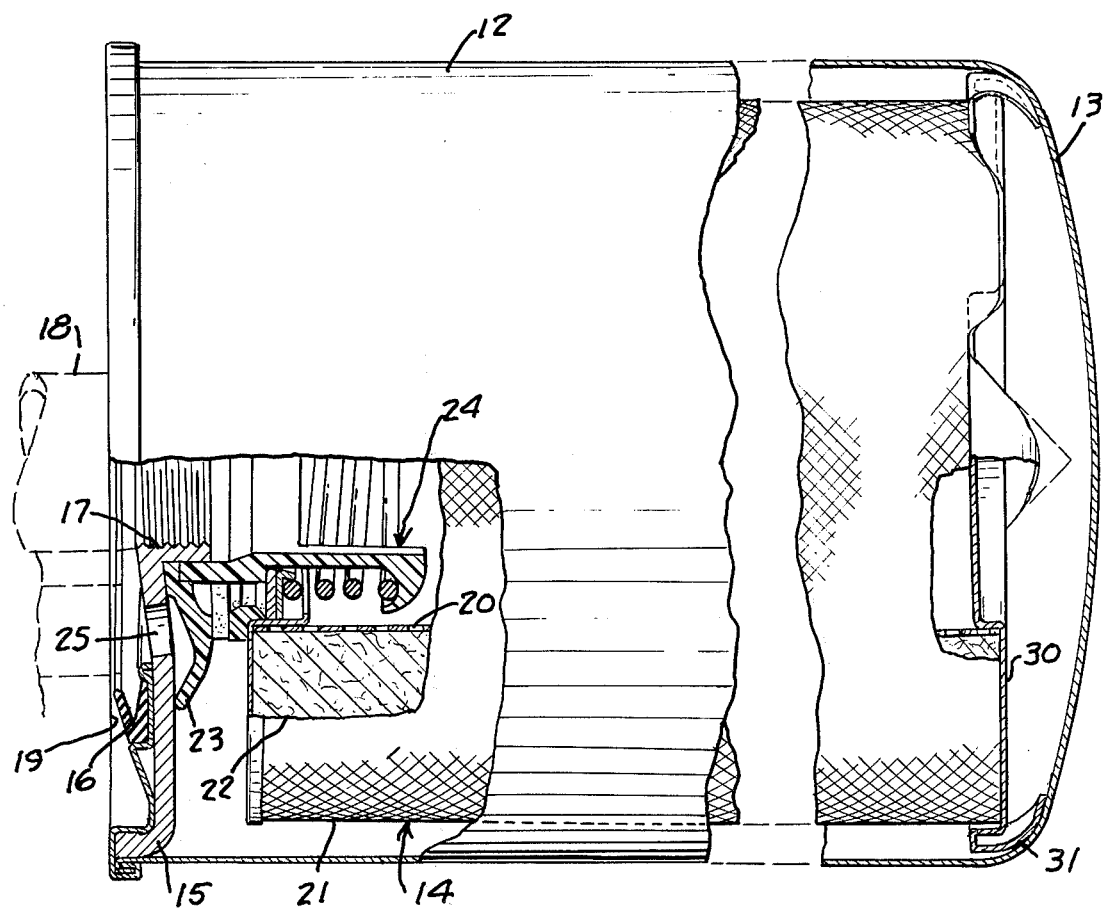
FIG. 2 is a fragmentary part sectional view on an enlarged scale of the filter embodying the invention.

Referring to FIGURE 1, the oil filter 10 embodying the invention comprises a casing 11 which includes a cylindrical body 12 having an integral convex domed end 13 and an opposed end. The filter further includes a filter element or cartridge 14 that is held in position by a crimped cap or end plate 15 that, in turn, supports a resilient gasket 16. The plate 15 has a centrally provided egress opening 17 which is threaded for engagement with the pipe 18 of the oil system of a vehicle. When the oil filter is threaded on the pipe 18, the gasket 16 engages a sealing surface 19 on the vehicle.

The oil filter element 14 comprises spaced foraminous walls 20, 21 and a filter material 22 filling the space between the walls. A pressure-relief valve 23 is provided between the opening 17 and the lower end of the filter element 14 to provide egress of the oil if the pressure exceeds a predetermined value. An anti-drain back valve 24 is interposed between the pressure relief valve and the mounting plate and controls the flow through the openings 25 which are circumferentially spaced in the mounting plate.

The above construction is old and is substantially shown in U.S. Pat. Nos. 3,669,144 and 3,156,259.

In accordance with the invention, the filter element includes an end element 30 that is made of sheet metal and includes integral axially extending spring ears or members 31.

As shown in FIGURE 4, the end element 30 is made from a square blank B by bending up the corners to form the integral spring members 31. The spring members 31 are connected to the remainder of the end element by downwardly flanged portions 32 so that there is a U-shaped cross section connecting the spring members 31 with the remainder of the end element as shown in FIGURE 6. A central portion 34 is deformed to locate end element on filter element 14.

As shown in FIGURE 5, the spring members 31 are arcuate in transverse cross section and are tapered and preferably triangular in shape.

By this arrangement, sufficient strength is provided to the spring members 31 and, at the same time, there is no waste of metal.

Figure 3:
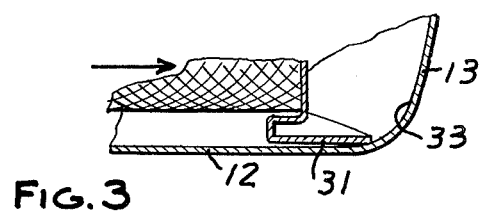
FIG. 3 is a fragmentary part sectional showing the parts during assembly.

In assembly, the filter element 14 with the spring members extending axially is inserted in the casing 12 as shown in FIGURE 3. As the filter element is inserted, the tapered spring members 31 engage the inner surface 33 of the integral end 13 and are gradually bent radially inwardly to apply a spring force on the filter element 14 and thereby hold it in position against the closure plate 15. The taper of the spring elements 31 facilitates the bending by permitting the force to be applied gradually to bend the members 31.

It can thus be seen that there has been provided an end for the filter element which performs the dual function of closing the filter element and serving as the spring. The metal end is formed from a square blank, thereby minimizing the amount of material and forming pressure since no blanking operation is required. The support for the cartridge is provided at the outer periphery of the cartridge so that the cartridge is not subject to extreme movement under pressure as might be the case if the spring were applied at the center of the dome. The spring ears 31 being arcuate in cross section have substantial strength. Since the ears are gradually tapered, they are easily deformed gradually by the inner surface of the domed end.

I claim:

1. A removable cartridge including
a filter element including
an annular filter portion through which fluid is adapted to flow, a first end member on one end of said annular filter portion closing the end of said annular filter portion and the space surrounded by said filter element at said one end, and a second end member closing the other end of said annular filter portion, said first end member having circumferentially spaced integral spring members extending from the periphery of said first end member axially of said annular filter portion and adapted to be bent radially inwardly when said cartridge is inserted axially into a casing, said spring members being connected to said body of said end member by interconnecting portions defining a flange which is U-shaped in longitudinal cross section with the legs of said U extending axially inwardly of said filter element and with the base of said U extending radially.

* * * * *

UNITED STATES PATENT OFFICE
CERTIFICATE OF CORRECTION

PATENT NO. : 4,035,306
DATED : July 12, 1977
INVENTOR(S) : Gerald E. Maddocks

It is certified that error appears in the above-identified patent and that said Letters Patent are hereby corrected as shown below:

Please change the inventor's place of residence from "Cambridge, Calif." to --Cambridge, Ontario, Canada--

Signed and Sealed this

Twenty-seventh Day of September 1977

[SEAL]

Attest:

RUTH C. MASON
Attesting Officer

LUTRELLE F. PARKER
Acting Commissioner of Patents and Trademarks